(12) United States Patent
St. John

(10) Patent No.: US 6,917,591 B2
(45) Date of Patent: Jul. 12, 2005

(54) METHODS, SYSTEMS AND COMPUTER PROGRAM PRODUCTS FOR BANDWIDTH ALLOCATION IN A MULTIPLE ACCESS SYSTEM

(75) Inventor: James T. St. John, Goode, VA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 869 days.

(21) Appl. No.: 09/759,672

(22) Filed: Jan. 12, 2001

(65) Prior Publication Data

US 2002/0136200 A1 Sep. 26, 2002

(51) Int. Cl.[7] ............................................. G01R 31/08
(52) U.S. Cl. .................. 370/235; 370/468; 370/395.21; 370/412
(58) Field of Search ................................ 370/230, 235, 370/395.21, 395.4, 395.42, 395.43, 412, 468, 395.41

(56) References Cited

U.S. PATENT DOCUMENTS

| | | | | |
|---|---|---|---|---|
| 5,864,540 A | * | 1/1999 | Bonomi et al. | 370/235 |
| 5,926,458 A | * | 7/1999 | Yin | 370/412 |
| 6,104,700 A | * | 8/2000 | Haddock et al. | 370/235 |
| 6,240,066 B1 | * | 5/2001 | Nagarajan et al. | 370/230 |
| 6,359,861 B1 | * | 3/2002 | Sui et al. | 370/230 |
| 6,438,134 B1 | * | 8/2002 | Chow et al. | 370/412 |
| 6,570,883 B1 | * | 5/2003 | Wong | 370/412 |
| 2003/0118029 A1 | * | 6/2003 | Maher et al. | 370/395.21 |

OTHER PUBLICATIONS

D. Wrege and J. Liebeherr, "A near–optimal packet scheduler for QoS networks," In Proceedings of INFOCOM, Kobe, Japan, Apr. 1997, pp. 577–585.

"Data Over Cable Service Interface Specification, Radio Frequency Interface Specifications," Cable Television Laboratories, Inc., 1999, pp. 1–424.

* cited by examiner

*Primary Examiner*—Ricky Ngo
*Assistant Examiner*—Nittaya Juntima (57) ABSTRACT

Embodiments of the present invention provide methods systems and computer program products for allocating excess and deficit bandwidth among a plurality of queues in a multiple access system. Each of the plurality of queues is associated with a quality of service and has a corresponding quantum value. An available quantum value based on a total amount of committed bandwidth on a downstream channel and a total amount of bandwidth on the downstream channel. The quantum values of each of the plurality of queues are updated by an update quantum value corresponding to respective ones of the plurality of queues. The update quantum values are based on the available quantum value, a total reserved quantum value corresponding to packets enqueued in the plurality of queues for an update period and the quality of service associated with the respective queue.

24 Claims, 7 Drawing Sheets

Figure 7

METHODS, SYSTEMS AND COMPUTER PROGRAM PRODUCTS FOR BANDWIDTH ALLOCATION IN A MULTIPLE ACCESS SYSTEM

BACKGROUND OF THE INVENTION

The present invention relates to the field of communications in general and more particularly to bandwidth allocation for a downstream channel.

With the rise in popularity of the Internet and other bi-directional communication services, new demands have been placed upon existing communications infrastructure to support the provision of such services. In light of the typical bandwidth limitations of the Public Switched Telephone Network (PSTN) commonly used for communications such as the Internet data communications, there have been efforts to provide these services over the Cable Television System (CATV) system. CATV typically provides a coaxial wired connection from a cable system service provider facility to end users. While CATV system has primarily been used to deliver downstream communications from the cable system service provider facility to the end users (such as cable television signals), it may also support upstream communications from end users to the CATV system provider. The downstream channel (side) is typically a one-to-many distribution network, the upstream channel is typically a many-to-one distribution network. As providing these services over the broadband cable network becomes more popular, bandwidth constraints of even the broadband downstream channel of the CATV system may pose problems.

Furthermore, as the Internet has been used for different types of media, such as streaming audio and streaming video, different levels of service have been used. Generally these different types of service may be categorized based on Quality of Service (QoS) criteria, such as guaranteed bandwidth, packet loss or the like. However, with a shared downstream channel QoS in a CATV system may be difficult, especially, when the system is over subscribed.

As mentioned above, the broadband cable network may support multiple classes of service, different traffic characteristics, and QoS requirements. QoS is typically supported by packet classification, flow admission, bandwidth allocation and buffer management. Flow admission typically requires users who request services at a certain QoS level to be admitted or denied access to the system depending on whether the QoS level can be supported. This generally results in either limiting the number of users that can subscribe to the system to the maximum number of users that can be supported or denying services to users during peak usage times. Existing systems typically drop low priority packets when the system is oversubscribed, and therefore typically sacrifice the QoS of the system. Accordingly, there is a need for improved methods of allocating bandwidth in order to preserve the QoS of the system.

SUMMARY OF THE INVENTION

Embodiments of the present invention provide methods systems and computer program products for allocating excess and deficit bandwidth among a plurality of queues in a multiple access system. Each of the plurality of queues is associated with a quality of service and has a corresponding quantum value. An available quantum value based on a total amount of committed bandwidth on a downstream channel and a total amount of bandwidth on the downstream channel. The quantum values of each of the plurality of queues are updated by an update quantum value corresponding to respective ones of the plurality of queues. The update quantum values are based on the available quantum value, a total reserved quantum value corresponding to packets enqueued in the plurality of queues for an update period and the quality of service associated with the respective queue.

In particular embodiments of the present invention, the quantum values correspond to the quality of service associated with the respective queue. Furthermore, the update period may be constant or variable and may be determined by determining the difference between the current time and the time of the last update period.

In particular embodiments of the present invention, the plurality of queues may contain a plurality of packets that are processed using a modified deficit round robin algorithm.

Furthermore, the available quantum value may be determined by calculating the total amount of committed bandwidth on the downstream channel and calculating the total amount of bandwidth on the downstream channel. In particular embodiments, the difference between the total amount of committed bandwidth on the downstream channel and the total amount of bandwidth on the downstream channel is determined to determine the available quantum value.

The total amount of committed bandwidth on the downstream channel may also be based on a total amount of bandwidth committed to voice traffic, data traffic and signaling traffic.

In further embodiments of the present invention, the quantum values are updated by calculating the total reserved quantum value for the update period based on a minimum reserved quantum value of each of the plurality of queues and updating the quantum values of each of the plurality of queues by an update quantum value. The update quantum value for each of the plurality of queues may be zero when the available quantum value is less than or equal to zero. The update quantum value may also comprise the minimum reserved quantum value for the update period increased by an excess quantum value for the update period when the available quantum value is larger than the total reserved quantum value. The update quantum value may further be the minimum reserved quantum value for the update period decreased by a deficit quantum value for the update period when the total reserved quantum value is larger than the available quantum value.

The excess quantum value and the deficit quantum value may correspond to the quality of service associated with the respective queue. For example, the excess quantum value and the deficit quantum value may be proportional to the quality of service associated with the respective queue.

Embodiments of the present invention may be provided in a broadband multiple access system.

DETAILED DESCRIPTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit." Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Embodiments of the present invention will now be described with reference to FIG. 1 which is a block diagram of an exemplary cable system including a bandwidth allocator 120 according to embodiments of the present invention. The exemplary cable network 130 figuratively illustrated in FIG. 1 includes cabling infrastructure such as coaxial cable or fiber optic cables connecting the remote subscriber locations to a Cable Modem Termination System or Cable Modem Terminal Server (CMTS) 110. The CMTS 110 can provide services, such as television service, telephone service, Internet service and other user services to subscribers of the cable system via a cable modem 140 by transferring data over the cable network 130. For example, an end user may access the IP network 100 (Internet) through the cable modem 140 from the user device 150. It is understood by those of skill in the art that the user device 150 can be one of many devices, including a telephone, a television, or a personal computer. It is also understood that although FIG. 1 only shows one cable modem 140, in reality an actual cable network, typically, would contain many cable modems.

The CMTS 110 manages the services provided to the respective subscribers in the cable system. For example, a first subscriber may receive television, telephone and Internet services while a second subscriber may receive only Internet service. Moreover, different subscribers may receive a different quality of service. For example, a first subscriber may receive Internet service at a relatively low bandwidth while a second subscriber may receive Internet service at relatively high bandwidth. Accordingly, the CMTS 110 transmits and receives data to and from the cable modems 140 at the rates associated with the respective subscribers. The cable modems 140 also support telephone and television services and may further support such services simultaneously with data communications such as those directed to the Internet.

It will be understood by those of skill in the art, that the data transfers between the CMTS 110 and the cable modems 140 may be performed according to standards known in the art. For example, data transfers between the CMTS 110 and the cable modems 140 may be performed using a time division multiple access (TDMA) technique wherein data is transmitted and received over the cable network 130 using channels identified as a pre-defined time slot or slots at a frequency. The upstream channel may include a plurality of such sub-channels. Standards for the transfer of data in cable systems are discussed in the Data Over Cable System Interface Specification (DOCSIS) published by Cable Television Laboratories Incorporated.

Figure 1:
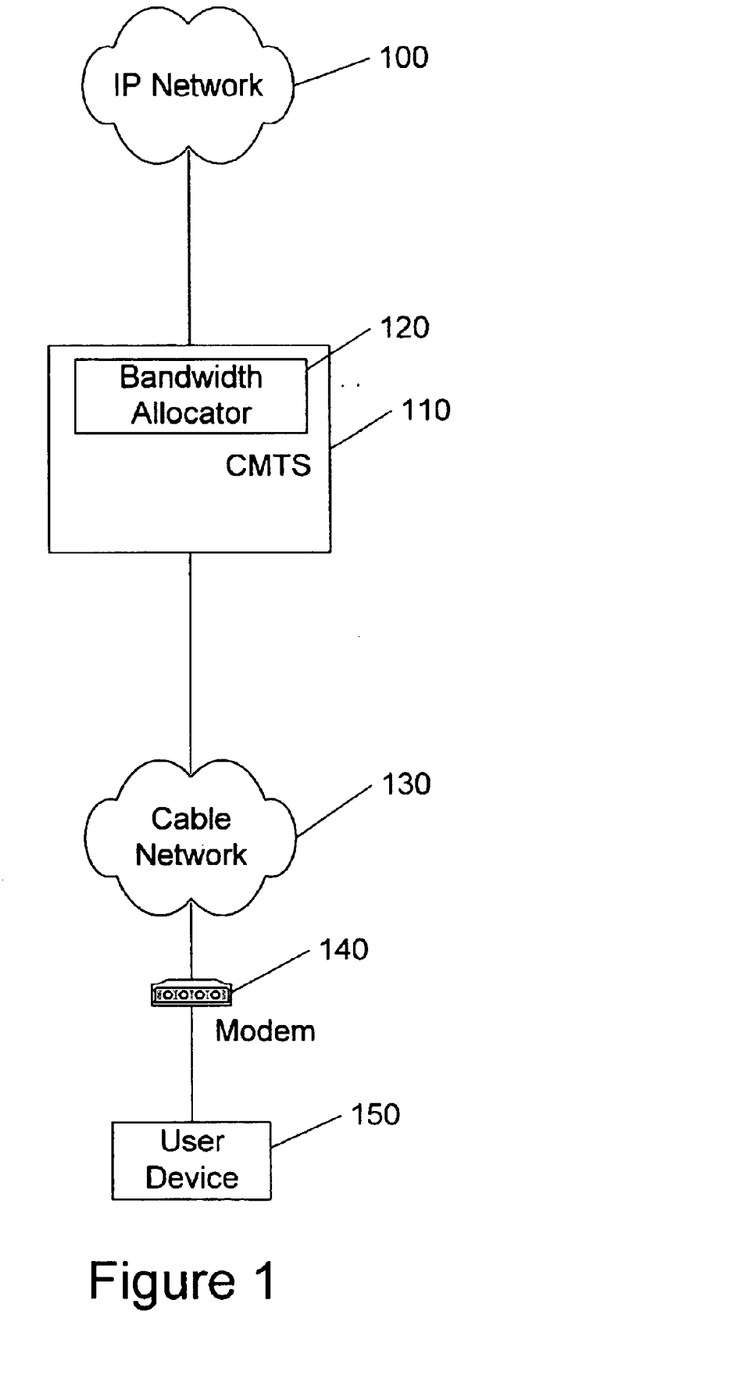
FIG. 1 is a schematic block diagram of a cable system including a bandwidth allocator according to embodiments of the present invention.

As shown in FIG. 1, the CMTS 110 in the illustrated embodiment includes a bandwidth allocator 120 according to embodiments of the present invention. The bandwidth allocator of the present invention may distribute the excess and deficit bandwidth on the downstream channel to the queues based on the QoS guarantees associated with the particular queues. Accordingly, the bandwidth allocator 120 of the present invention may preserve the QoS of the system while maximizing the use of available resources.

Now referring to FIG. 2, a block diagram of the CMTS 110 including the bandwidth allocator according to embodiments of the present invention will be described. Packets arriving at the CMTS 110 may be classified based on their individual QoS requirements. The packets may then be directed to a queue (210, 215, 220) capable of providing the requested level of service. Although the present invention is described with reference to the three-queue system shown in FIG. 2 the system may have many more queues, the three-queue system is only exemplary. Once the packets are placed in the queues, the queues are processed using operations as described herein for bandwidth allocation to move packets from the queues 210, 215, and 220 to the output queue 225. Embodiments of the present invention provide a modified deficit round robin approach for moving packets from the queues 210, 215, and 220 to the output queue 225.

Figure 2:
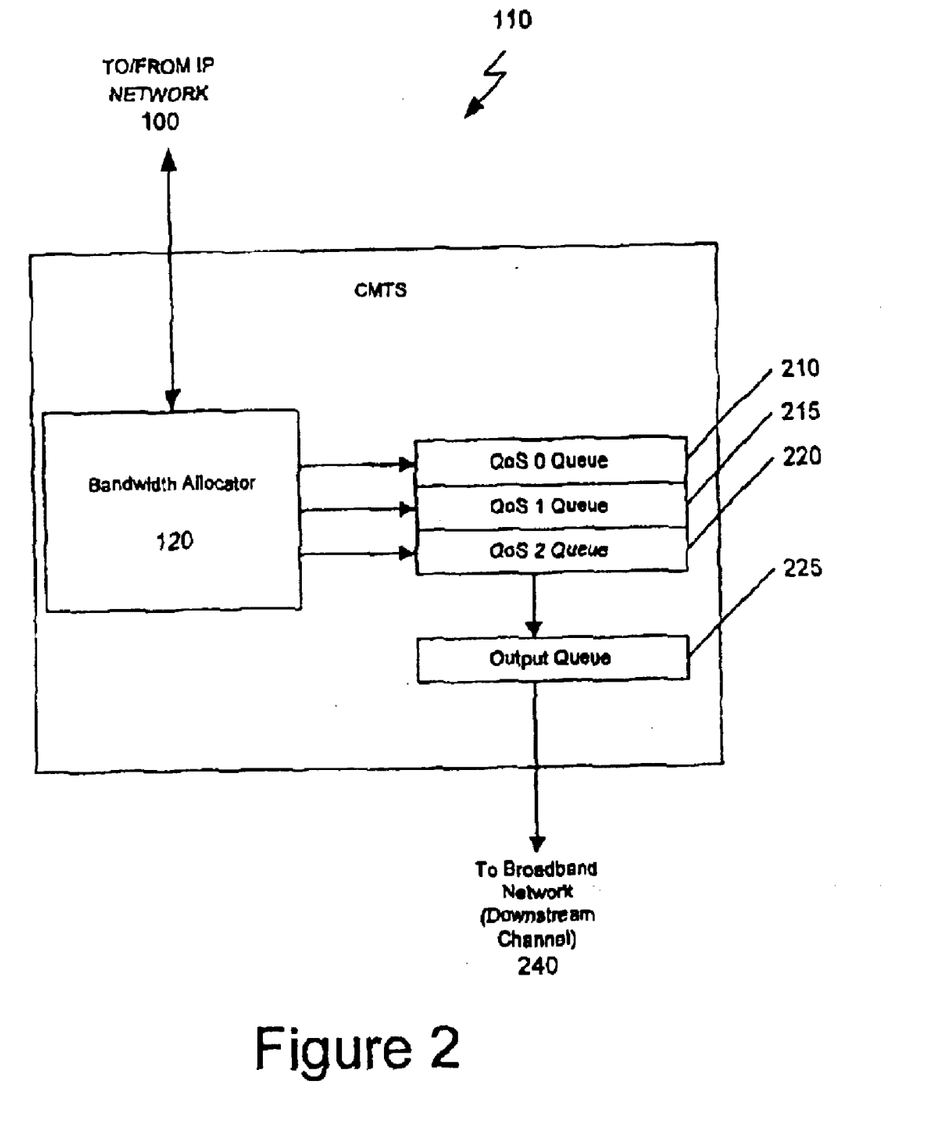
FIG. 2 is a block diagram of the Cable Modem Terminal Server (CMTS) including a bandwidth allocator according to embodiments of the present invention.

The present invention is described herein with reference to the cable system shown in FIG. 1 and the CMTS 110 shown in FIG. 2. However, as will be appreciated by those of skill in the art, the present invention is applicable to any cable network configuration. Furthermore, the functions of the present invention may be implemented utilizing a data processing system operating under software control, as dedicated hardware or a combination of the two. Thus, the queues may be implemented as partitions in processing system memory, as FIFO buffer integrated circuits, as locations on a storage device such as a hard disk or other storage media or other such devices know to those of skill in the art.

The bandwidth allocator 120 shown in FIGS. 1 and 2 may distribute bandwidth to the individual queues 210, 215 and 220. Each queue is typically assigned a quantum value which defines the throughput of that particular queue. In other words, the quantum value of each queue typically defines the QoS that each particular queue can guarantee. The quantum value typically represents the quantity of bandwidth that is assigned to a queue and may be defined in terms of a bit value, for example, the quantum values for a queues 210, 215 and 220 may be set to 500 bits, 750 bits and 1000 bits, respectively. For a fully loaded system, the sum of the quantum values (bits) of all the queues multiplied by the service rate is typically equal to the available bandwidth on the downstream channel 240. When the system is underloaded the bandwidth allocator may distribute the excess downstream bandwidth to the queues. When the system is overloaded (over subscribed) the bandwidth allocator may distribute the deficit downstream bandwidth to the queues. Each queue may not get allocated the same amount of bandwidth, the distribution of bandwidth is typically done in a manner that preserves the relative QoS levels of each of the queues.

Figure 3:
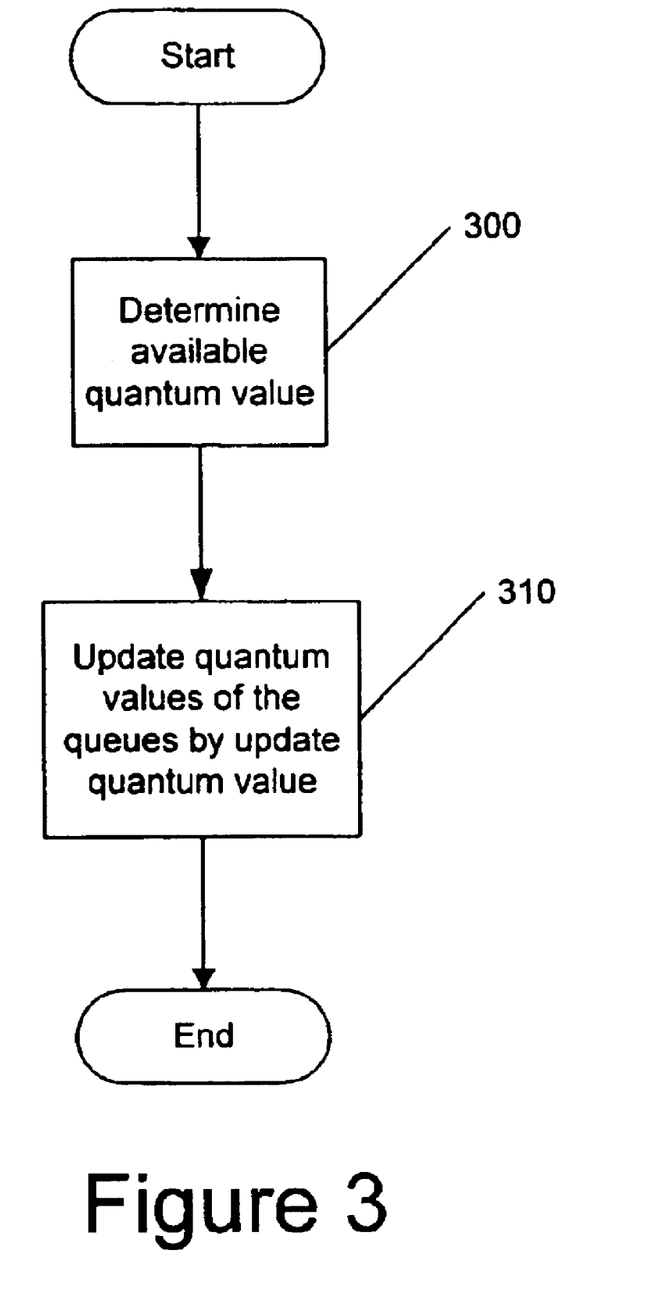
FIG. 3 is a flow chart illustrating operations for bandwidth allocation according to embodiments of the present invention.

Embodiments of the present invention will now be described with reference to FIG. 3 which is a flow chart illustrating operations of the bandwidth allocator 120 according to embodiments of the present invention. The available quantum value (available bandwidth) on the downstream channel is determined (block 300). The available quantum may be calculated with respect to the total downstream bandwidth and the total committed bandwidth. Committed bandwidth is that bandwidth which has already been committed to, for example, voice traffic, data traffic, and/or signaling traffic. For example, the above variables may be calculated as follows:

Total Available Quantum=(1.0−overhead)×(Downstream Bandwidth)−(Committed Bandwidth), where Committed Bandwidth=Committed Voice Bandwidth+Committed Data Bandwidth+Committed Signaling Bandwidth Committed Voice Bandwidth = {For $N$ active service flows}
= Downstream Maximum Sustained Rate (Voice Service Flow 1) + Downstream Maximum Sustained Rate (Voice Service Flow 2) ... + Downstream Maximum Sustained Rate (Voice Service Flow $N$)

Committed Data Bandwidth=DC.0+DC.1+DC.2 Committed Signaling Bandwidth=0.1×Committed Voice Bandwidth Overhead is typically the percent of the downstream bandwidth assigned to overhead messaging. The downstream maximum sustained traffic rate may depend on the QoS of the queue and refers to the maximum downstream bandwidth per service flow. A service flow is typically the path taken by a packet from the CMTS 110 on the downstream channel to the user device 150. These service flows may be classified by QoS. Once the available quantum value is calculated the quantum value of each queue may be updated by an update quantum value (block 310).

Once the quantum value of a queue is updated by the update quantum value, the packets in that queue may be serviced by first placing them in the output queue and then sending them to their destination on the downstream channel. Many approaches may be used to process these packets. Embodiments of the present invention may implement a DRR approach to processing the packets in the queues.

Deficit round robin (DRR) services the queues using a round robin servicing scheme. Since round robin servicing is well known to those having skill in the art. Deficit round robin differs from traditional round robin in that a queue being processed may not be able to send a packet because its packet size is larger than the quantum value assigned to the queue. Furthermore, another queue may be able to send multiple packets whose cumulative bit count is less than the quantum value of the queue.

Embodiments of the present invention may implement a modified version of the existing DRR approach. Traditional deficit round robin uses a static quantum value for each priority (QoS). Therefore, if the quantity and size of the packets entering the system is either larger or smaller than can be accounted for by a static quantum value, bandwidth may either be wasted or bandwidth that is not available on the downstream channel may distributed to the queues and QoS is typically lost. To account for these problems with the existing method of processing packets, embodiments of the present invention may distribute the excess or deficit bandwidth to the queues based on the QoS of the particular queues, and therefore may provide variable quantum values for the queues in the system.

Figure 4:
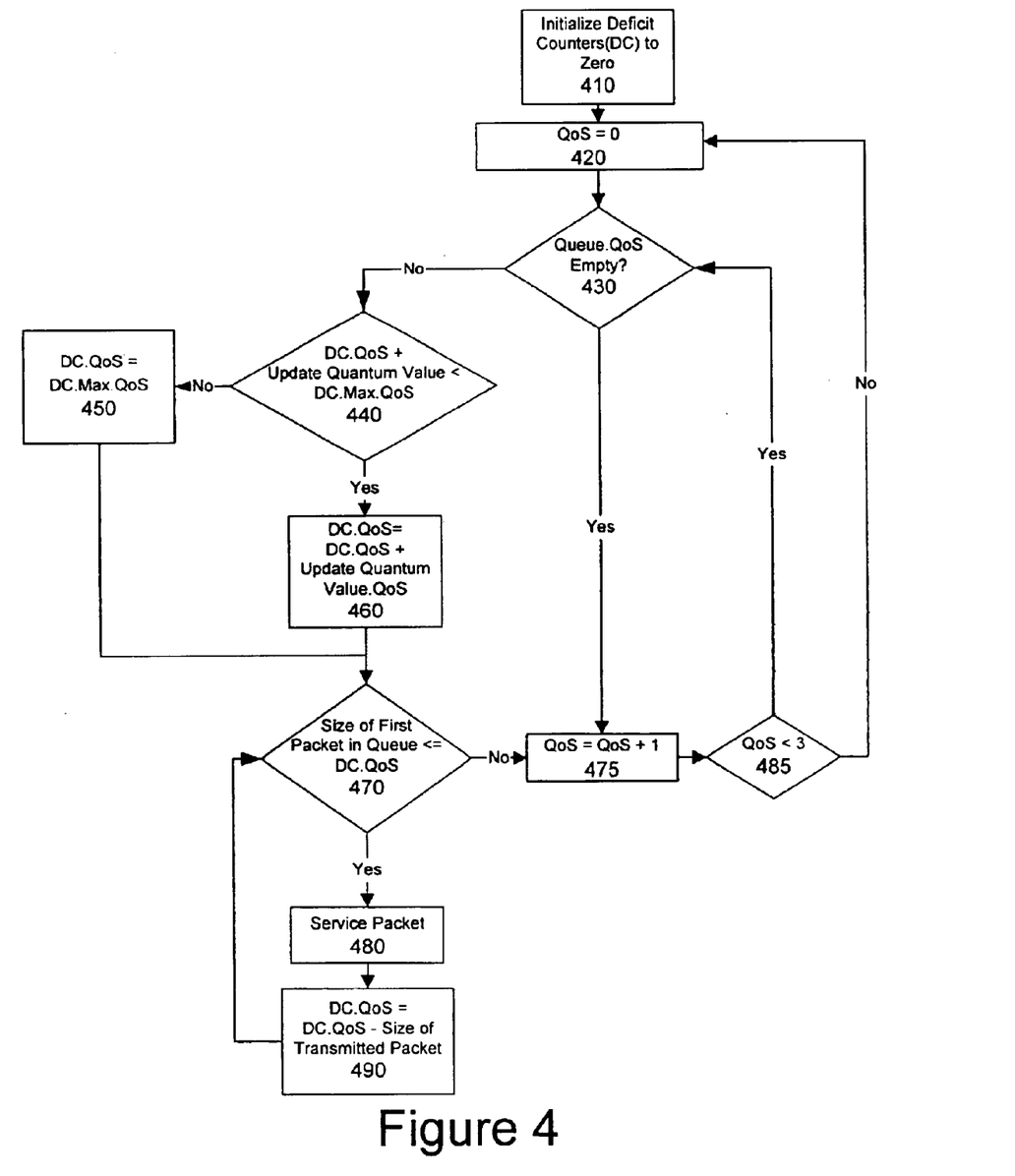
FIG. 4 is a flow chart illustrating operations for processing packets using a Deficit Round Robin (DRR) approach according to embodiments of the present invention.

Now referring to FIG. 4, a flow chart illustrating operations for processing packets using a modified DRR approach according to embodiments of the present invention will be described. Each queue typically has a deficit counter (DC.0, DC.1, DC.2) that identifies the quantum value of the queue. Each queue may be assigned a different quantum value corresponding to a different QoS. In other words, generally the larger the quantum value assigned to a queue, the greater the QoS guarantee associated with that particular queue.

The deficit counter of each of queues 210, 215 and 220 is initially set to zero (block 410). QoS is then set to zero (block 420). QoS may be synonymous with priority if the priority of a queue is defined by the QoS of the queue. Generally the greater the QoS guarantee the higher the priority. It is determined if queue 210 with QoS=0 has any packets to send (block 430). If queue 210 does not have any packets to send, QoS is set to QoS+1 (block 475). It is determined if QoS is less than 3 (block 485). This is done to determine if all queues have been serviced this service round. If QoS is less than 3, the operations return to block 430 and the process repeats for QoS=QoS+1 because the service round is not complete. If QoS is greater than or equal to 3, operations return to block 420 which sets the QoS back to zero and begins a new service round.

If it is determined that queue 210 with QoS=0 has packets to send, the quantum value of the deficit counter for this queue (DC.0) is increased by the value that the quantum value is to be updated this update round (Update Quantum Value). The update quantum value is typically based on the available quantum value, the total reserved quantum value for an update round, and the quality of service associated with each of the queues. The total reserved quantum value may be determined with reference to the minimum reserved quantum value of each of the queues at each QoS level. The minimum reserved quantum value is typically the quantum value needed to meet the minimum reserved traffic rate for each QoS (0,1,2) data traffic. For example:

Minimum Reserved Quantum Value 0=Quantum value needed to meet the minimum reserved traffic for QoS 0 data traffic.

Minimum Reserved Quantum Value 1=Quantum value needed to meet the minimum reserved traffic for QoS 1 data traffic.

Minimum Reserved Quantum Value 2=Quantum value needed to meet the minimum reserved traffic for QoS 2 data traffic.

Therefore, the total reserved quantum value is typically equal to the sum of all of the minimum reserved quantum values.

The sum of the deficit counter and the update quantum value is then compared to the maximum possible value of the deficit counter for this queue (DC.Max.QoS) (block 440). If this sum is less than the DC.Max.QoS then the deficit counter for this queue is set equal to DC.QoS increased by the Update Quantum Value.QoS (block 460) if this sum is greater than the DC.Max.QoS then the deficit counter for this queue is set equal to the DC.Max.Qos (block 450).

The maximum possible value of the deficit counter for each queue (DC.Max.QoS) is typically determined with respect to the number of active service flows at the particular QoS of the queue and the maximum sustained traffic rate of the downstream traffic for the particular QoS of the queue. As stated above, a service flow is typically the path taken by a packet from the CMTS 110 on the downstream channel to the user device 150. Service flows are typically divided by QoS. The number of active service flows may be determined with respect to the number of service flows that currently have at least one packet classified to that flow.

Once the quantum value of the deficit counter for the queue is set for the current service round, it is determined if the size of the first packet in the queue is less than or equal to the quantum value of the deficit counter for that queue (block 470). If the first packet is less than or equal to the quantum value of the deficit counter, the first packet in the queue is serviced (block 480). Once the first packet is serviced the deficit counter is decreased by the size of the transmitted packet (block 490). Operations return to block 490 and the process repeats until the size of the packet to be sent exceeds the value the deficit counter.

When the value of the deficit counter is exceeded by the size of the first packet in the queue, operations proceed to block 475 which sets QoS to QoS+1. It is determined if QoS is less than 3 (block 485). If QoS is less than 3, operations return to block 430 and the process repeats for QoS=QoS+1 because the service round is not complete. If QoS is greater than or equal to 3, operations return to block 420 which sets the QoS back to zero and begins a new service round.

The calculation of the update quantum value, described above with reference to FIG. 4, may be implemented differently depending on whether the system is underloaded or overloaded. When the system is underloaded the update quantum value for each queue may be higher than the minimum reserved quantum value for each queue. On the other hand, when the system in overloaded the update quantum value for each queue may be less than the minimum reserved quantum value for each queue.

Embodiments of the present invention will now be described with reference to FIG. 5 which is a flow chart illustrating operations for bandwidth allocation. Packets arriving at the network request a QoS (block 500). The packets are then classified according to their QoS request and directed to a queue capable of meeting the QoS request (block 510). The available quantum value (available bandwidth) on the downstream channel is calculated as discussed above with reference to FIG. 4 (block 520). It is determined if the available quantum value is equal to or greater than zero (block 530). In other words, it is determined if there is any available bandwidth on the downstream channel. If there is no available bandwidth (the available quantum value is less than zero) then the quantum update value is set to zero (block 535) because there is no available bandwidth to distribute to the queues.

If it is determined that the available quantum value is greater than or equal to zero, the total reserved quantum value is calculated as discussed above (block 540) and compared to the available quantum value (block 550). If it is determined that the available quantum value exceeds the total reserved quantum value, the quantum values of the queues are updated using operations for allocating excess bandwidth according to embodiments of the present invention (block 560). In other words, after meeting the minimum needs of the system, there is extra bandwidth on the downstream channel which may be distributed to the queues. The excess algorithm will be discussed below with reference to FIG. 6. If it is determined that the total reserved quantum value exceeds the available quantum value, the quantum values of the queues are updated using operations for allocating deficit bandwidth according to embodiments of the present invention (block 555). In other words, there is not enough bandwidth available on the downstream channel to meet the minimum needs of the system. The deficit algorithm will be discussed below with reference to FIG. 7.

The excess and deficit quantum values may vary with the QoS to be provided to a particular service flow. The quantum value is based on the number of packets in the queue and the guaranteed throughput of the queue (QoS of the queue). Embodiments of the present invention deal with the situation when the guaranteed throughput is either higher or lower than the system throughput. When there is excess bandwidth the guaranteed throughput is lower than the system throughput. When there is not enough bandwidth, a deficit, the guaranteed throughput is higher than the system throughput.

Now referring to FIG. 6, a flowchart illustrating operations for allocating excess bandwidth according to embodiments of the present invention will be described. QoS is set equal to 0 (block 600). The minimum reserved quantum value for the queues with QoS=0 is calculated (block 610) as discussed above. The minimum reserved quantum value 0 is the quantum value needed to meet the minimum reserved traffic for QoS 0 data traffic.

The excess quantum value for the queues with QoS=0 is calculated (block 620). The quantum value is typically calculated to provide for discrimination between different levels of service, a minimum level of service, fair distribution of resources in an over subscribed system and/or optimal distribution in an under utilized system.

The quantum calculations may require the CMTS 110 to track, or have access to, the number of active service flows and the QoS parameters of all downstream service flows. An active downstream service flow, as defined above, typically is the number of service flows that currently have at least one packet classified to that flow. The active service flows may also be divided by QoS. The number of active service flows may be tracked in a table. Such a table typically keeps track of, for example, queue related information such as current priority of each queue, current priority level for queue servicing, the number of jobs (requests) in each queue, and the queue from which requests are currently being serviced. This table may be referred to as queue priority and service table (QPS table). The QPS, or default value, is assigned during classification.

Each downstream service flow is typically associated with the QoS parameter. The QoS parameter may be based on traffic priority, downstream maximum sustained traffic rate, and/or minimum reserved traffic rate. For voice traffic the service flow is typically associated with grant size, grant interval, and/or grants per interval.

Referring again to FIG. 8, the update quantum value is set equal to the sum of the excess quantum value and the minimum reserved quantum value (block 630). This update quantum value may be used as the update quantum value discussed above with reference to FIG. 4 (blocks 440 and 460) The quantum value of the queue with QoS=0 is set equal to the update quantum value (block 640). QoS is set equal to QoS+1 (block 850). It is determined if QoS is less than 3 (block 660). If QoS is less than 3, operations return to 610 and the process repeats for QoS=QoS+1 because the update round is not complete. If QoS is not less than 3, operations return to block 600 which sets the QoS back to zero and begins a new update round when the update$_{13}$ interval is complete.

The quantum values are updated at a time interval equal to update_interval. If this interval cannot be held constant, then update_interval may be set to the current time decreased by the last update interval. Here, the last update interval may be set equal to the current time at the time that the quantum values are updated.

Figure 7:
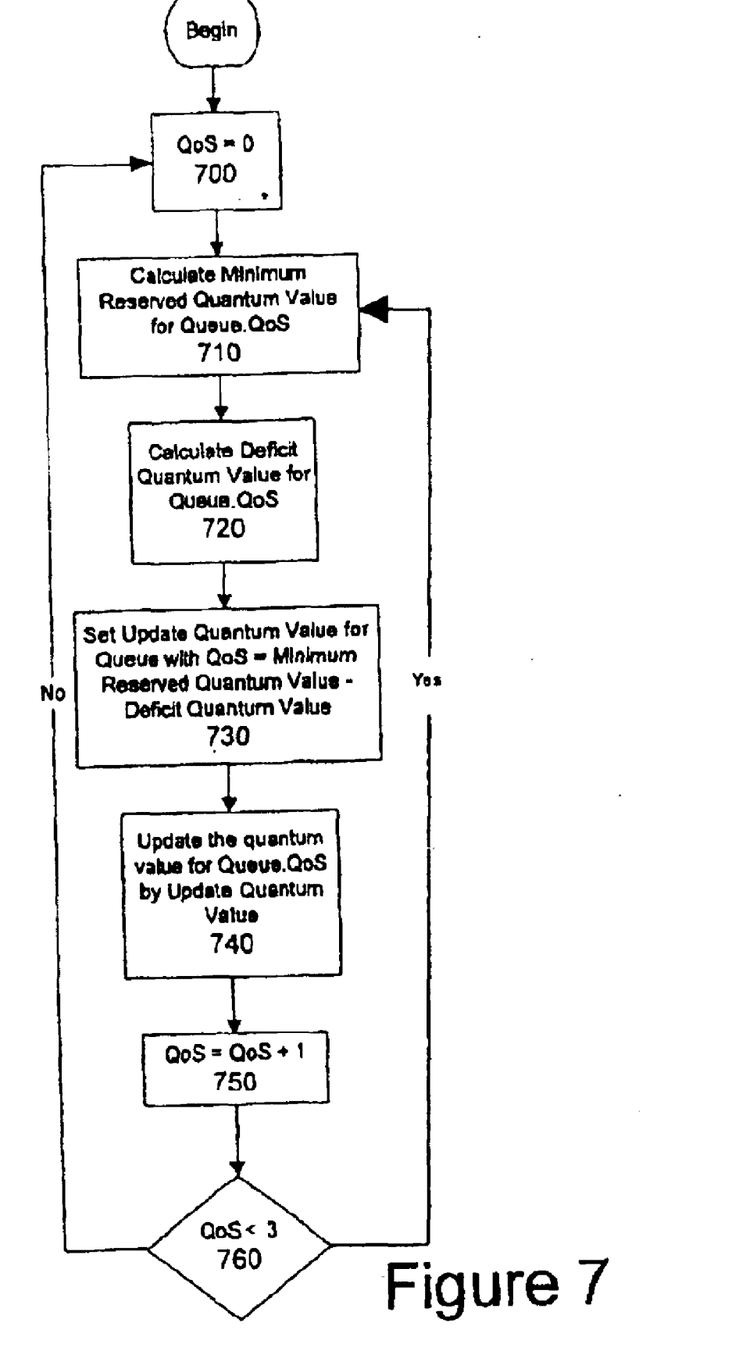
FIG. 7 is a flow chart illustrating operations for allocating bandwidth deficit according to embodiments of the present invention.

Referring now to FIG. 7, a flow chart illustrating operations for allocating deficit bandwidth according to embodiments of the present invention will be described. QoS is set equal to 0 (block 700). The minimum reserved quantum value for queues with QoS=0 is calculated (block 710). As stated above, the minimum reserved quantum value 0 is the quantum value needed to meet the minimum reserved traffic for QoS 0 data traffic.

The deficit quantum value for the queues with QoS=0 is calculated (block 720). The quantum value is typically calculated to provide for discrimination between different levels of service, a minimum level of service, fair distribution of resources in an over subscribed system and/or optimal distribution in an under utilized system.

The update quantum value is set equal to the minimum reserved quantum value decreased by the deficit quantum value (block 730). This update quantum value may be used as the update quantum value discussed above with reference to FIG. 4 (blocks 440 and 460). The quantum value for queue with QoS=0 is set equal to the update quantum value (block 740). Then QoS is set equal to QoS+1 (block 750). It is determined if QoS is less than 3 (block 760). If QoS is less than 3, operations return to block 710 and the process repeats for QoS=QoS+1 because the update round is not complete. If QoS is not less than 3, operations return to block 700 which sets the QoS beck to zero and begins a new update round when the update_interval is complete.

In particular embodiments of the present invention the variables discussed above may be described by the following equations. The variables included in the equations may be defined as shown in Table 1 below.

CASE: Available_Bandwidth>=0.0:

CASE: Available Minimum Quantum Update>=0.0

Update Quantum Value.0=update_interval×(min_Quant_update_0+UU_weight_0×DC.0/Commited_Data_BW×Availiable_Bandwdith)

Update Quantum Value.1=update_interval×(min_Quant_update_1+UU_weight_1×DC.1/Commited_Data_BW×Availiable_Bandwdith)

Update Quantum Value.2=update_interval×(min_Quant_update_2+UU_weight_2×DC.2/Commited_Data_BW×Availiable_Bandwdith)

WHERE:

update_interval=(Current_time−Previous_service_time+min_update_interval)

FOR THIS APPLICATION:

UU_weight_0+UU_weight_1+UU_weight_2=1.0

Min_Quant_Update_0=Number of Active Service Flows at Priority 0×minimum_reserved_traffic_rate Min_Quant_Update_1=Number of Active Service Flows at Priority 1×minimum_reserved_traffic_rate Min_Quant_Update_2=Number of Active Service Flows at Priority 2×minimum_reserved_traffic_rate DC.Max.0=(Number of Active Service Flows at Priority 0)×(Downstream Maximum Sustained Traffic Rate 0)

DC.Max.1=(Number of Active Service Flows at Priority 1)×(Downstream Maximum Sustained Traffic Rate 1)

DC.Max.2=(Number of Active Service Flows at Priority 2)×(Downstream Maximum Sustained Traffic Rate 2)

CASE: Available_Bandwidth<0.0

IF

Downstream Maximum Sustained Rate (Voice Service Flow 1)+Downstream

Maximum Sustained Rate (Voice Service Flow 2)+ . . . Downstream Maximum

Sustained Rate (Voice Service Flow N)+(OU_weight_0×Number of Active Service

Flows at Priority 0×minimum_reserved_traffic_rate_0)+(OU_weight_1×Number of Active Service Flows at Priority 1×minimum_reserved_traffic_rate_1)+

(OU_weight_2×Number of Active Service Flows at Priority 2× minimum_reserved_rate_2)<=Available Bandwidth

THEN

Update Quantum Value.0=update_interval×(OU_weight_0×Number of Active service Flows at Priority 0×minimum_reserved_traffic_rate_0)

Update Quantum Value.1=update_interval×(OU_weight_1×Number of Active service Flows at Priority 1×minimum_reserved_traffic_rate_1)

Update Quantum Value.2=update_interval×(OU_weight_2×Number of Active service Flows at Priority 2×minimum_reserved_traffic_rate_2)

WHERE update_interval=(Current_time−Previous_service_time+min_update_interval) For this implementation:

OU_weight_0=OU_weight_1=OU_weight_2

OU_weight_0=(Downstream_Bandwidth−Committed_Voice_BW−Committed_Signaling_BW)+(Committed_Data_Bandwidth)

TABLE 1

| Variable | Comment |
|---|---|
| DC.QoS | Value of the Deficit Counter for each priority. Priority = {0, 1, 2} |
| DC.Max.QoS | Maximum Value of the deficit counter for each priority. Priority = {0, 1, 2} |
| Update Quantum Value.QoS | The value the deficit counter is updated at each update cycle. Priority = {0, 1, 2} |
| Available_Bandwidth | Bandwidth available to schedule new data traffic |
| Downstream_Bandwidth | Total Bandwidth available on the downlink |
| Committed_BW | Total committed bandwidth |
| Committed_Data_BW | Bandwidth currently committed to transmit Data |
| Committed_Voice_BW | Bandwidth currently committed to transmit Voice |
| Committed_Signaling_BW | Bandwidth currently committed to transmit Signaling |
| Minimum Reserved Quantum Update.0 | Quantum update needed to meet minimum reserved traffic rate for priority 0 data traffic |
| Minimum Reserved Quantum Update.1 | Quantum update needed to meet minimum reserved traffic rate for priority 1 data traffic |
| Minimum Reserved Quantum Update.2 | Quantum update needed to meet minimum reserved traffic rate for priority 2 data traffic |
| Update Quantum Value.0 | Amount priority (QoS) 0 quantum is updated |
| Update Quantum Value.1 | Amount priority (QoS) 1 quantum is updated |

TABLE 1-continued

| Variable | Comment |
|---|---|
| Update Quantum Value.2 | Amount priority (QoS) 2 quantum is updated |
| Overhead | Percent of downstream bandwidth assigned to overhead messaging |
| Downstream_Symbols_per_sec | Symbol rate of downstream |
| Bits_Symbol | Bits per downstream symbol |
| Downstream max sustained rate | QoS parameter defining the maximum Downstream Bandwidth per service flow |
| Downstream min reserved traffic rate | QoS parameter defining the minimum Downstream bandwidth per service flow |
| Update_interval | Time between Quantum updates |
| Min_update_interval | A constant added to the update_interval to create a minimum quantum update |
| UU_weight_0 | Distribution weight given to excess bandwidth for priority 0 Best Effort service |
| UU_weight_1 | Distribution weight given to excess bandwidth for priority 1 Best Effort service |
| UU_weight_2 | Distribution weight given to excess bandwidth for priority 2 Best Effort service |
| OU_weight_0 | Distribution weight given to deficit bandwidth for priority 0 Best Effort service |
| OU_weight_1 | Distribution weight given to deficit bandwidth for priority 1 Best Effort service |
| UU_weight_2 | Distribution weight given to deficit bandwidth for priority 2 Best Effort service |
| Number of Active Service Flows (Voice and Data) | Active Service Flows |

The flowcharts and block diagrams of FIGS. 1 through 7 illustrate the architecture, functionality, and operation of possible implementations of systems, methods and computer program products for allocating bandwidth according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A system for allocating bandwidth comprising:
    a plurality of queues, each of the plurality of queues being associated with a quality of service and having a corresponding quantum value, configured to store packets arriving from the network;
    an output queue configured to receive packets from the plurality of queues and forward them to a channel;
    a bandwidth allocator circuit configured to classify received packets based on quality of service requirements and direct the packets to one of the plurality of queues, the bandwidth allocator circuit further comprising:

a bandwidth differential circuit configured to determine an available quantum value based on a total amount of committed bandwidth on a downstream channel and a total amount of bandwidth on the downstream channel; and a quantum updating circuit configured to update the quantum values of each of the plurality of queues by an update quantum value corresponding to respective ones of the plurality of queues, the update quantum values being based on the available quantum value, a total reserved quantum value corresponding to packets enqueued in the plurality of queues for an update period and the quality of service associated with the respective queue.

2. The system to claim 1, wherein the quantum values correspond to the quality of service associated with the respective queue.

3. The system according to claim 1, wherein bandwidth differential circuit comprises:

a bandwidth calculator circuit configured to calculate the total amount of committed bandwidth on the downstream channel and the total amount of bandwidth on the downstream channel and the difference between the total amount of committed bandwidth on the downstream channel and the total amount of bandwidth on the downstream channel.

4. The system according to claim 3, wherein the bandwidth calculator circuit is further configured to calculate the total amount of committed bandwidth on the downstream channel based on a total amount of bandwidth committed to voice traffic, data traffic and signaling traffic.

5. The system according to claim 1, wherein the quantum updating circuit comprises:

a quantum calculator circuit configured to calculate the total reserved quantum value for the update period based on a minimum reserved quantum value of each of the plurality of queues and update the quantum values of each of the plurality of queues by an update quantum value, wherein the update quantum value for each of the plurality of queues comprises:

zero when the available quantum value is less than zero;

the minimum reserved quantum value for the update period plus an excess quantum value for the update period when the available quantum value is larger than the total reserved quantum value; and the minimum reserved quantum value for the update period minus a deficit quantum value for the update period when the total reserved quantum value is larger than the available quantum value.

6. The system according to claim 5, wherein the excess quantum value and the deficit quantum value correspond to the quality of service associated with the respective queue.

7. The system according to claim 5, wherein the excess quantum value and the deficit quantum value are proportional to the quality of service associated with the respective queue.

8. The system according to claim 1 wherein the system is a broadband multiple access system.

9. The system according to claim 1 wherein the update period is a constant update interval.

10. A system according to claim 1 wherein the update period is not a constant update interval.

11. The system according to claim 10, wherein the update period is a current time minus a time of the last update period.

12. The system according to claim 1, wherein the plurality of queues contain a plurality of packets that are processed using a deficit round robin algorithm.

13. A method for allocating bandwidth in an apparatus having a plurality of input queues configured to store packets arriving from a network and an output queue configured to receive packets from the plurality of input queues and forward them to a channel, said method comprising the steps of:

classifying, using a bandwidth allocator circuit, received packets based on quality of service requirements and direct the packets to one of the plurality of input queues, each of the plurality of input queues being associated with a quality of service and having a corresponding quantum value, the bandwidth allocator circuit operative to perform the steps of:

determining, using a bandwidth differential circuit, an available quantum value based on a total amount of committed bandwidth on a downstream channel and a total amount of bandwidth on the downstream channel; and updating, using a quantum updating circuit, the quantum values of each of the plurality of queues by an update quantum value corresponding to respective ones of the plurality of queues, the update quantum values being based on the available quantum value, a total reserved quantum value corresponding to packets enqueued in the plurality of Input queues for an update period and the quality of service associated with the respective queue.

14. The method of claim 13, wherein the quantum values correspond to the quality of service associated with the respective queue.

15. The method according to claim 13, wherein said bandwidth differential circuit further comprises a bandwidth calculator circuit configured to calculate the total amount of committed bandwidth on the downstream channel and the total amount of bandwidth on the downstream channel and the difference between the total amount of committed bandwidth on the downstream channel and the total amount of bandwidth on the downstream channel.

16. The method according to claim 15, wherein the bandwidth calculator circuit is further configured to calculate the total amount of committed bandwidth on the downstream channel based on a total amount of bandwidth committed to voice traffic, data traffic and signaling traffic.

17. The method according to claim 13, wherein the quantum updating circuit comprises a quantum calculator circuit configured to calculate the total reserved quantum value for the update period based on a minimum reserved quantum value of each of the plurality of queues and update the quantum values of each of the plurality of queues by an update quantum value, wherein the update quantum value for each of the plurality of input queues is:

zero when the available quantum value is less than zero;

the minimum reserved quantum value for the update period plus an excess quantum value for the update period when the available quantum value is larger than the total reserved quantum value; and the minimum reserved quantum value for the update period minus a deficit quantum value for the update period when the total reserved quantum value is larger than the available quantum value.

18. The method according to claim 17, wherein the excess quantum value and the deficit quantum value correspond to the quality of service associated with the respective queue.

19. The method according to claim 17, wherein the excess quantum value end the deficit quantum value are proportional to the quality of service associated with the respective queue.

20. The method according to claim 13 wherein the system is a broadband multiple access system.

21. The method according to claim 13 wherein the update period is a constant update interval.

22. The method according to claim 13 wherein the update period is not a constant update interval.

23. The method according to claim 22, wherein the update period is a current time minus a time of the last update period.

24. The method according to claim 13, wherein tile plurality of queues contain a plurality of packets that are processed using a deficit round robin algorithm.

* * * * *

UNITED STATES PATENT AND TRADEMARK OFFICE
CERTIFICATE OF CORRECTION

PATENT NO. : 6,917,591 B2  Page 1 of 2
APPLICATION NO. : 09/759672
DATED : July 12, 2005
INVENTOR(S) : St. John It is certified that error appears in the above-identified patent and that said Letters Patent is hereby corrected as shown below:

On the Title Page, Field (56), under "OTHER PUBLICATION", In Column 2, Line 4, delete "Specification" and insert -- Specifications --, therefor.

On the Title Page, Field (56), under "OTHER PUBLICATION", In Column 2, Line 5, delete "Specifications" and insert -- Specification --, therefor.

Figure 5:
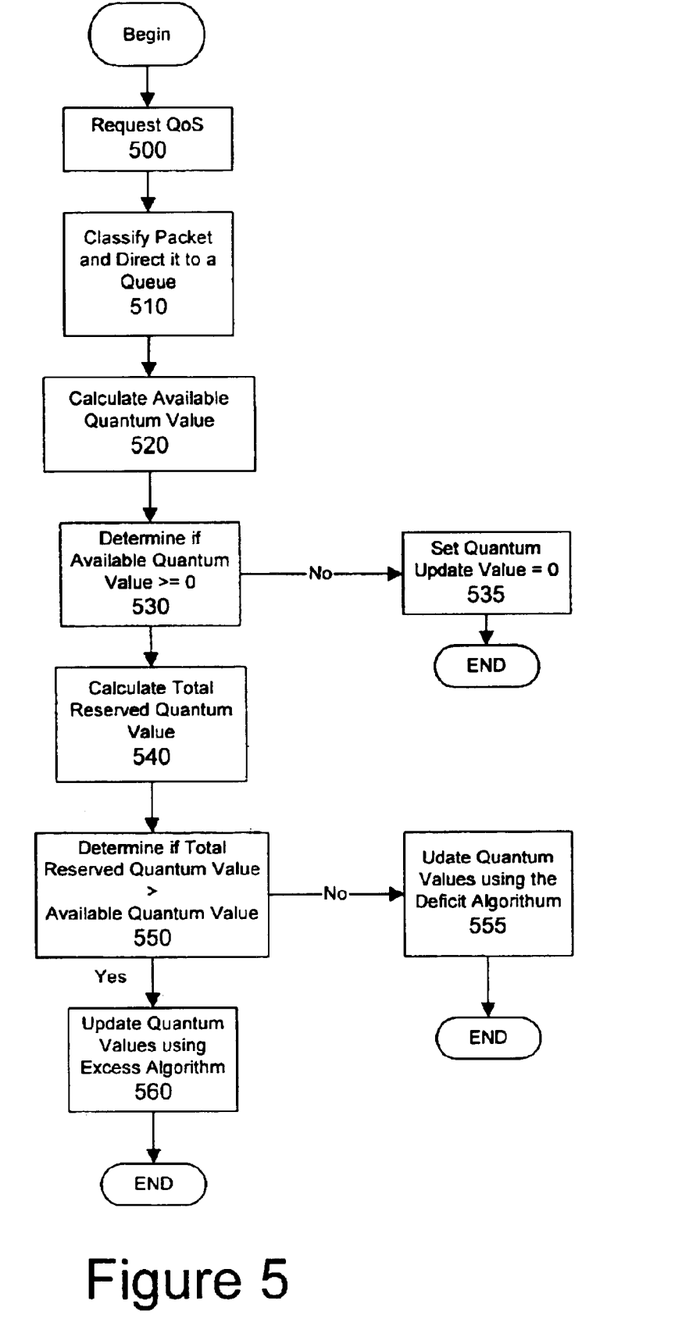
FIG. 5 is a flow chart illustrating operations for bandwidth allocation according to embodiments of the present invention.

In the Drawings, Sheet 5 of 7, Figure 5, box 555, delete "Udate" and insert -- Update --, therefor.

In Column 7, Line 53, delete "(block 460) if" and insert -- (block 460). If --, therefor.

Figure 6:
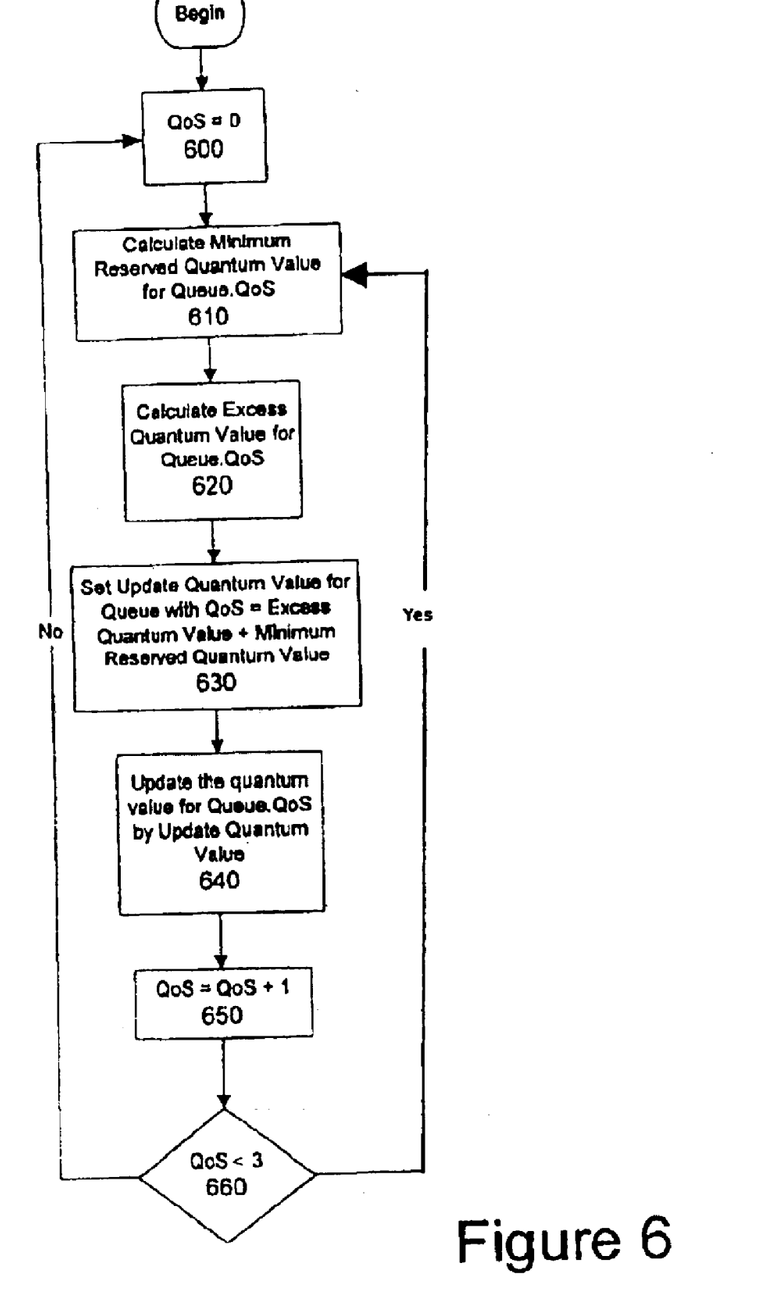
FIG. 6 is a flow chart illustrating operations for allocating excess bandwidth according to embodiments of the present invention.

In Column 9, Line 43, delete "FIG. 8" and insert -- FIG. 6 --, therefor.

In Column 9, Line 48, after "460)" insert -- . --.

In Column 9, Line 50, delete "(block 850)" and insert -- (block 650) --, therefor.

In Column 9, Line 52, insert -- block -- before "610".

In Column 9, Lines 55-56, delete "update13 interval" and insert -- update_interval --, therefor.

In Column 10, Line 32, delete "Commited" and insert -- Committed --, therefor.

In Column 10, Line 32, delete "Availiable" and insert -- Available --, therefor.

In Column 10, Line 35, delete "Commited" and insert -- Committed --, therefor.

In Column 10, Line 35, delete "Availiable" and insert -- Available --, therefor.

In Column 10, Line 38, delete "Commited" and insert -- Committed --, therefor.

In Column 10, Line 38, delete "Availiable" and insert -- Available --, therefor.

In Column 11, Line 13, after "minimum_reserved_" insert -- traffic_ --.

In Column 11, Line 34, delete "+" and insert -- ÷ --, therefor.

In Column 14, Line 26, in Claim 13, delete "Input" and insert -- input --, therefor.

UNITED STATES PATENT AND TRADEMARK OFFICE
CERTIFICATE OF CORRECTION

PATENT NO. : 6,917,591 B2 Page 2 of 2
APPLICATION NO. : 09/759672
DATED : July 12, 2005
INVENTOR(S) : St. John It is certified that error appears in the above-identified patent and that said Letters Patent is hereby corrected as shown below:

In Column 16, Line 5, in Claim 24, delete "tile" and insert -- the --, therefor.

Signed and Sealed this

Fourth Day of March, 2008

JON W. DUDAS
*Director of the United States Patent and Trademark Office*